United States Patent
Koch et al.

(10) Patent No.: US 6,671,264 B1
(45) Date of Patent: Dec. 30, 2003

(54) METHOD FOR DETECTING INVALID PACKETS BY ASSIGNING SUPER-TRANSACTION IDENTIFIERS

(75) Inventors: Edward L. Koch, San Rafael, CA (US); Stefan Soucek, Trumau (AT)

(73) Assignee: Loytec Electronics GmbH, Vienna (AT)

( * ) Notice: Subject to any disclaimer, the term of this patent is extended or adjusted under 35 U.S.C. 154(b) by 0 days.

(21) Appl. No.: 09/610,082

(22) Filed: Jul. 5, 2000

(51) Int. Cl.[7] .................................................. H04B 1/44
(52) U.S. Cl. ....................................... 370/282; 370/389
(58) Field of Search ................................. 370/230, 235, 370/236, 282, 384, 389, 392, 393, 397, 409

(56) References Cited

U.S. PATENT DOCUMENTS 5,481,535 A * 1/1996 Hershey ...................... 370/312
6,195,711 B1   2/2001 Inoue et al.
6,247,058 B1   6/2001 Miller et al.

* cited by examiner

*Primary Examiner*—Ajit Patel
*Assistant Examiner*—Brenda Pham
(74) *Attorney, Agent, or Firm*—Sawyer Law Group LLP (57) ABSTRACT

The present invention provides a method for reliable stale packet recognition in a network. The method includes: labeling a packet with a super transaction identifier (STID), the STID uniquely indicating a transaction; sending the packet with the STID to the receiving router; and blocking the sent packet from transmission to the receiving node if a transaction timer for the transaction indicated by the STID has expired. The method adds a STID to each packet. Each transaction is assigned a unique STID by the sending router, and each packet of the transaction is labeled with this STID. The receiving router uses the STID to block duplicate packets with the same STID which arrive after the expiration of the transaction timer. In this manner, stale packets are reliably detected by the receiving router.

17 Claims, 7 Drawing Sheets

METHOD FOR DETECTING INVALID PACKETS BY ASSIGNING SUPER-TRANSACTION IDENTIFIERS

FIELD OF THE INVENTION

The present invention relates to control networks utilizing a network protocol, and more specifically to the use of transaction identifiers for control network packets traveling in network which utilize the network protocol.

BACKGROUND OF THE INVENTION

Figure 1A:
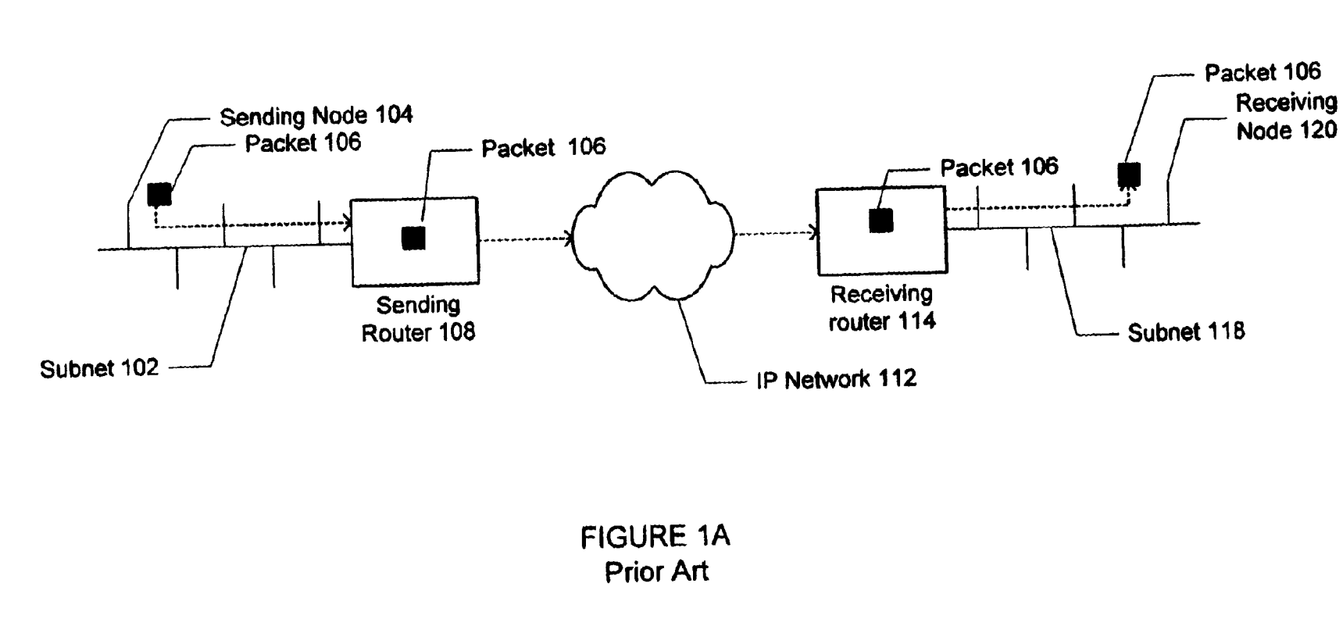
FIG. 1A illustrates a network which transports the LonTalk protocol.

LonTalk™ is a well known control network communications protocol designed for Local Area Network (LAN) type environments. This protocol can also be transported in an Internet protocol (IP) environment as well. FIG. 1A illustrates an IP network which is used to transport the LonTalk protocol. The network includes subnets 102 and 118, each with local nodes. Local nodes on one subnet 102 are able to communicate with nodes on the remote subnet 118 over the IP network 112. An exchange of information between nodes is carried out in a transaction. Each transaction involves at least one packet. For example, a sending node 104 on subnet 102 prepares a packet 106 addressed to the receiving node 120 on subnet 118. The sending node 104 assigns a Transaction Identifier (TID) to all packets of a certain transaction. In LonTalk, 4-bits are used for the TID, i.e., 16 possible TIDs are available. This packet 106 is forwarded to the sending router 108 which services the sending node's subnet 102. The packet 106 is then transmitted to the receiving router 114 which services the subnet 118 containing the receiving node 120. The receiving router 114 then forwards the packet 106 to the receiving node 120.

At the receiving node 120, a transaction timer (receive timer) begins to run when a transaction begins. The receive transaction is active until the timer expires or a new transaction is started. Packets received containing the same TID while the transaction is active are assumed by the receiving node 120 to be part of the same transaction. Each time the receiving node 120 receives a packet 106, it may send to the sending node 104 an acknowledgment packet, which informs the sending node 104 that the packet 106 was actually received by the receiving node 104.

Occasionally, packets need to be retransmitted due to transmission errors and are given the same TID as the original packet. While the transaction is active, if the receiving node had already received the original packet, it will properly detect packets with the same TID to be duplicates. In LonTalk, the length of the transaction timer is set according to the possible delays in packet transmission in a LAN, which do not vary significantly. However, in an IP network, the delays can vary over a wider range and can be unpredictable. Thus, there is a problem in an IP network that packets become delayed such that they arrive after the expiration of the transaction timer. In this situation, the receiving node will not be able to recognize stale duplicate packets as such. It may mistakenly see the duplicate packet as indicating the beginning of a new transaction, resulting in erroneous functioning in the control network application.

Accordingly, there exists a need for a method to detect stale packets for reliable duplicate packet recognition for the control network. The present invention addresses such a need.

SUMMARY OF THE INVENTION

The present invention provides a method for reliable stale packet recognition in a network. The method includes: labeling a packet with a super transaction identifier (STID), the STID uniquely indicating a transaction; sending the packet with the STID to the receiving router; and blocking the sent packet from transmission to the receiving node if a transaction timer for the transaction indicated by the STID has expired. The method adds a STID to each packet. Each transaction is assigned a unique STID by the sending router, and each packet of the transaction is labeled with this STID. The receiving router uses the STID to block duplicate packets with the same STID which arrive after the expiration of the transaction timer. In this manner, stale packets are reliably detected by the receiving router.

DETAILED DESCRIPTION

The present invention provides a method for reliable stale packet recognition in a network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The method in accordance with the present invention provides reliable stale packet recognition in a network utilizing LonTalk by adding a super transaction identifier (STID) to each packet. Each transaction is assigned a unique STID by the sending router, and each packet of the transaction is labeled with this STID. Thus, each packet has a 4-bit transaction identifier (TID), provided according to the LonTalk protocol, and an additional STID. The receiving router uses the STID to block duplicate packets with the same STID which arrive after the expiration of the transaction timer. In this manner, stale packets are reliably detected by the receiving router.

To more particularly describe the features of the present invention, please refer to FIGS. 1B through 6 in conjunction with the discussion below.

Figure 1B:
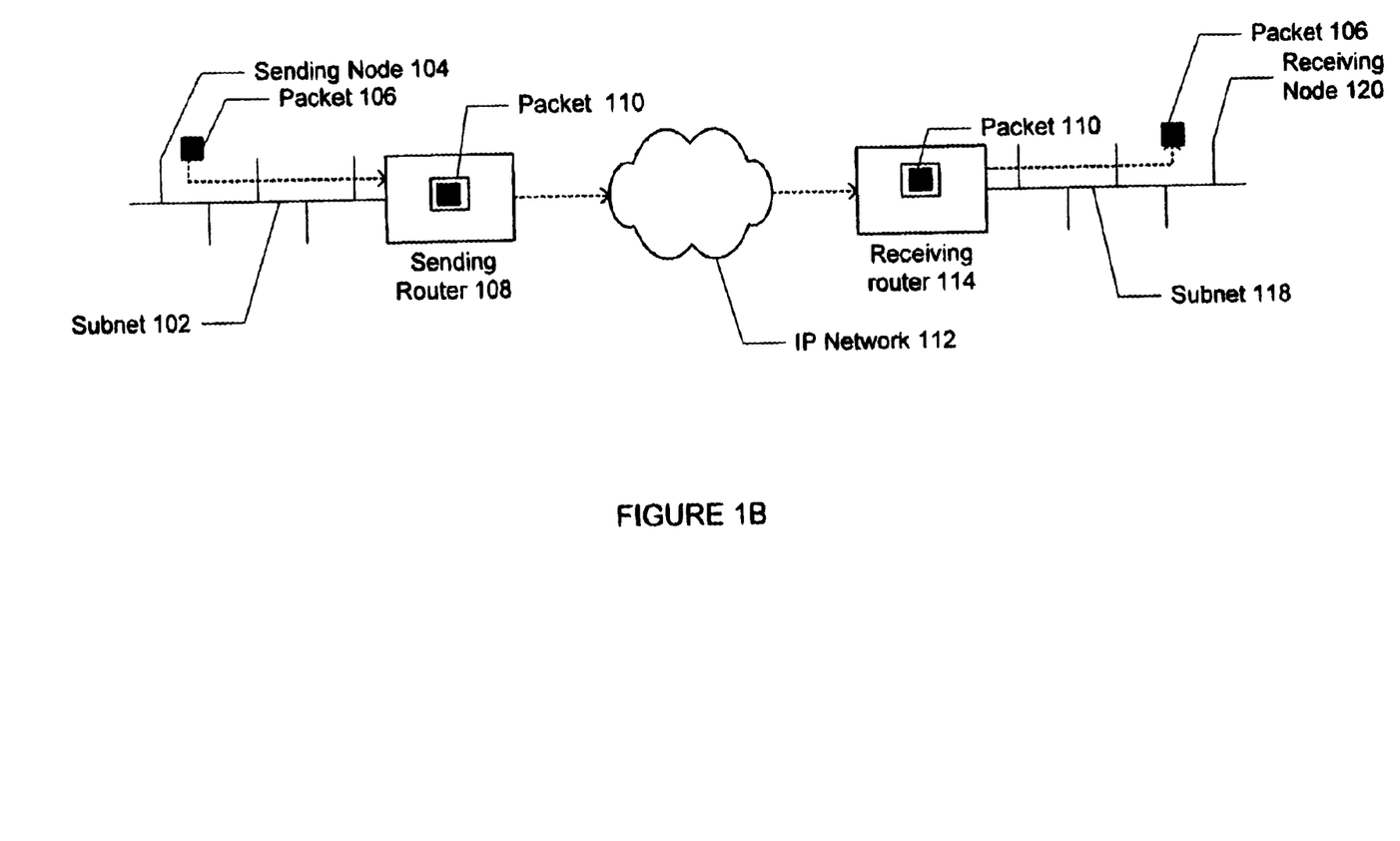
FIG. 1B illustrates a network which uses the method for reliable stale packet recognition in accordance with the present invention.

FIG. 1B illustrates a network which uses the method for reliable stale packet recognition in accordance with the present invention. The network in FIG. 1B is the same as the network in FIG. 1A except information comprising the STID is added to the packet 106 from the sending node 104. When the sending router 108 receives the packet 106 from the sending node 104, it adds the STID. The packet 110 with the STID is then transported via the IP network 112 to the receiving router 114. The receiving router 114 uses the STID in the packet 110 to block the packet 110 if it is stale, and forwards the original packet 106 to the receiving node 120 if it is not.

Figure 2:
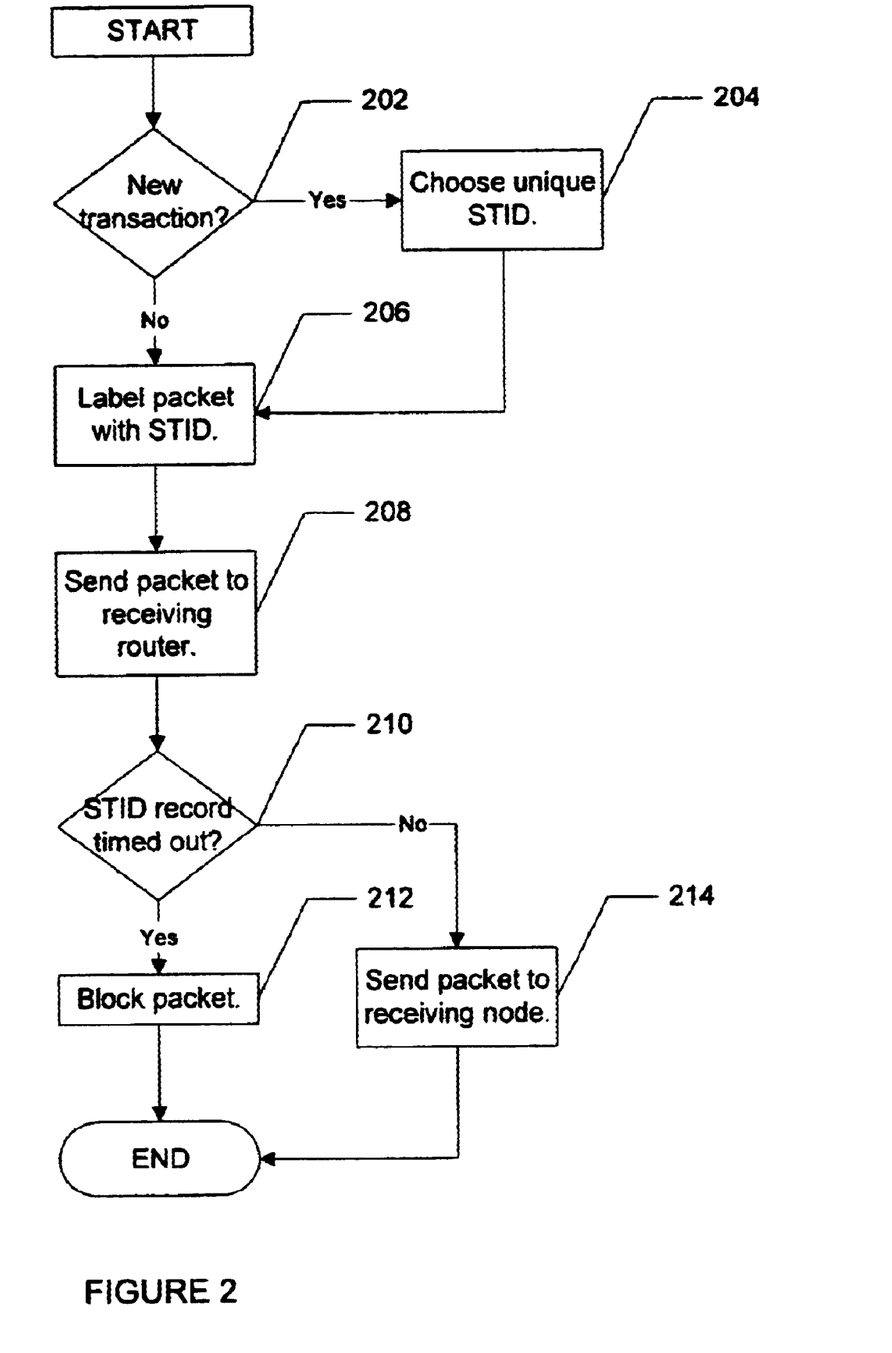
FIG. 2 is a flow chart illustrating a preferred embodiment of a method for reliable stale packet recognition in accordance with the present invention.

FIG. 2 is a flow chart illustrating a preferred embodiment of a method for reliable stale packet recognition in accordance with the present invention. Steps 202–208 are performed by the sending router 108, while steps 210–214 are performed by the receiving router 114. First, the sending router 108 determines if a packet 106 from a sending node 104 is part of a new transaction, via step 202. If it is not, then the sending router 108 labels the packet 106 with the STID of the current transaction, via step 206. If it is part of a new transaction, then the sending router 108 chooses a unique STID for the new transaction, via step 204, and labels the packet 106 with this unique STID, via step 206. The packet 110 thus has either the STID of the current transaction or the unique STID of the new transaction. The packet 110 is then sent to the receiving router 114, via step 208, through the IP network 112.

When the receiving router 114 receives the packet 110, it first determines if the STID record has timed out, via step 210, i.e., if the transaction indicated by the STID is still active. If the STID record has timed out, then the packet 110 is stale and so is blocked, via step 212. If the STID record has not timed out, then the transaction is still active, and the original packet 106 is sent to the receiving node 120, via step 214.

Figure 3:
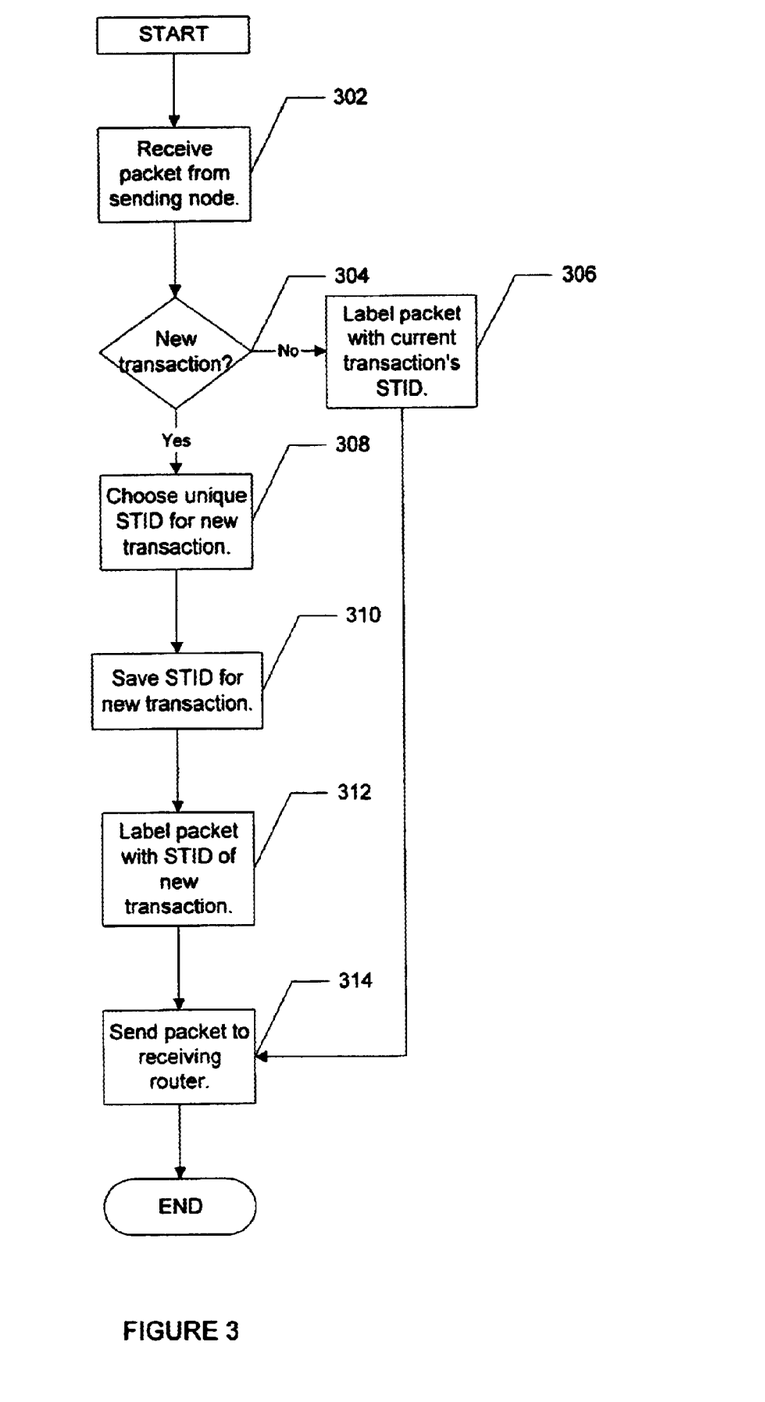
FIG. 3 is a flow chart illustrating in more detail the steps performed by the sending router in the method for reliable stale packet recognition in accordance with the present invention.

FIG. 3 is a flow chart illustrating in more detail the steps performed by the sending router in the method for reliable stale packet recognition in accordance with the present invention. First, the sending router 108 receives the packet 106 from the sending node 104, via step 302. The sending router 108 determines if the packet 106 is part of a new transaction, via step 304. If not, then the packet 110 is labeled with the current transaction's STID, via step 306, and sent to the receiving router 114, via step 314. If the packet 106 is part of a new transaction, then the sending router 108 chooses a unique STID for the new transaction, via step 308. The STID for the new transaction is saved, via step 310, and the packet 106 is labeled with the new STID, via step 312. The packet 110 is then sent to the receiving router 114, via step 314.

Figure 4:
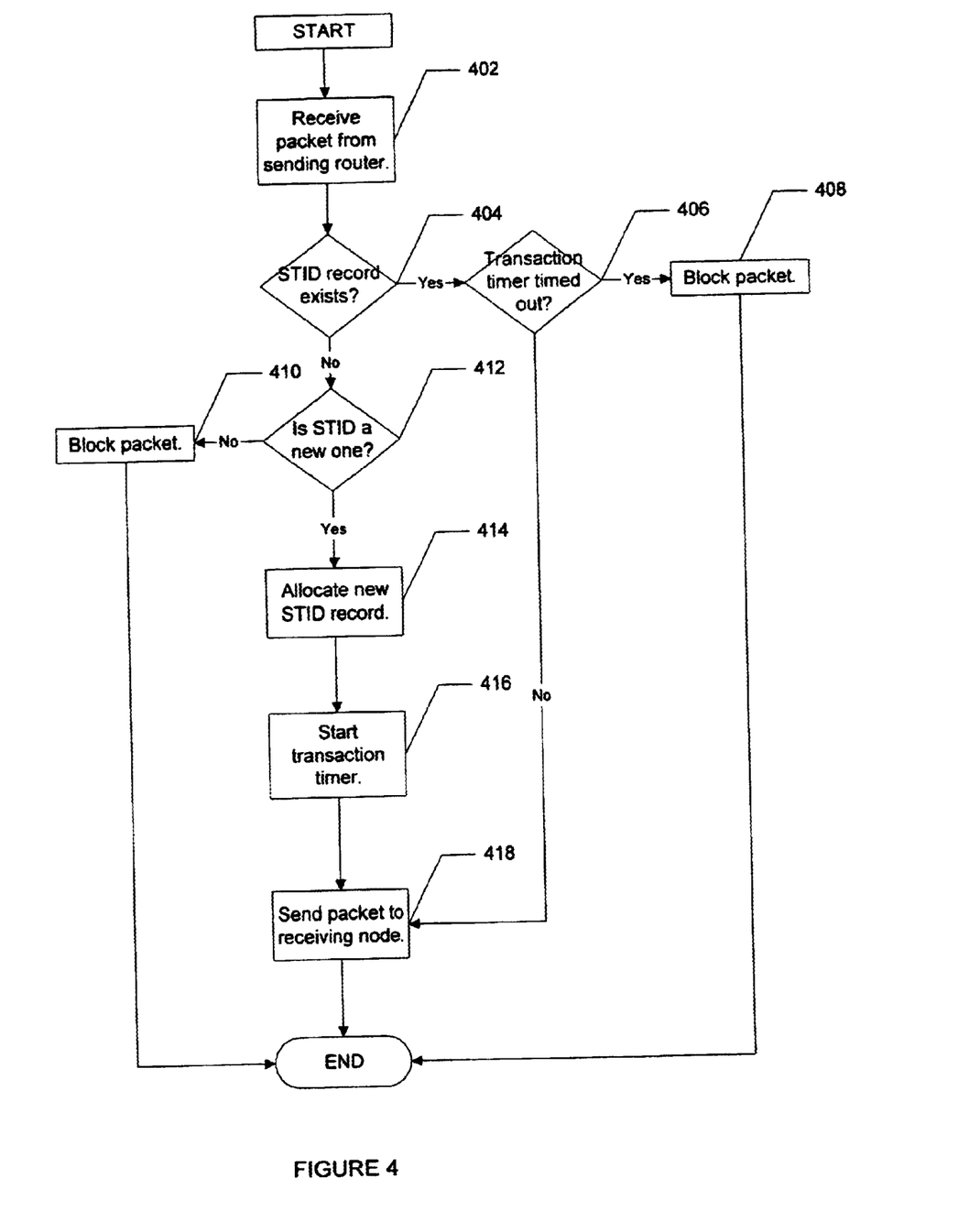
FIG. 4 is a flow chart illustrating in more detail the steps performed by the receiving router in the method for reliable stale packet recognition in accordance with the present invention.

FIG. 4 is a flow chart illustrating in more detail the steps performed by the receiving router in the method for reliable stale packet recognition in accordance with the present invention. First, the receiving router 114 receives the packet 110 from the sending router 108, via step 402. The receiving router 114 determines if a record for the packet's STID exists, via step 404. If a record does exist, then the packet 110 is part of a transaction that has occurred or is active. The receiving router 114 then determines if the transaction timer for the STID's transaction has timed out, via step 406. If the transaction timer has timed out, then the packet 110 is stale and is blocked, via step 408. If the transaction timer has not timed out, then the transaction is still active, and the original packet 106 is forwarded to the receiving node, via step 418.

If the receiving router 114 determines that a record for the STID does not exist, via step 404, then the receiving router 114 next determines if the STID is a new one, via step 412. In the STID is not a new one, then the packet 110 is part of a transaction which is no longer active and for which the receiving router 114 no longer has the records. In this case, the packet 110 is stale and is blocked via step 410. If the STID is a new one, then the packet 110 is part of a new transaction. The receiving router 114 allocates a new STID record for the transaction, via step 414, starts the new transaction's timer, via step 416, and sends the original packet 106 to the receiving node 120, via step 418. In the preferred embodiment, once a new transaction is started, the receiving router 114 removes the records of the previous transaction from its memory, but maintains a record of the used STIDs. Because a unique STID is assigned to each transaction, the used STIDs themselves are adequate to ensure reliable stale packet recognition. Thus, the method in accordance with the present invention can result in significant memory savings at the receiving router.

Figure 5:
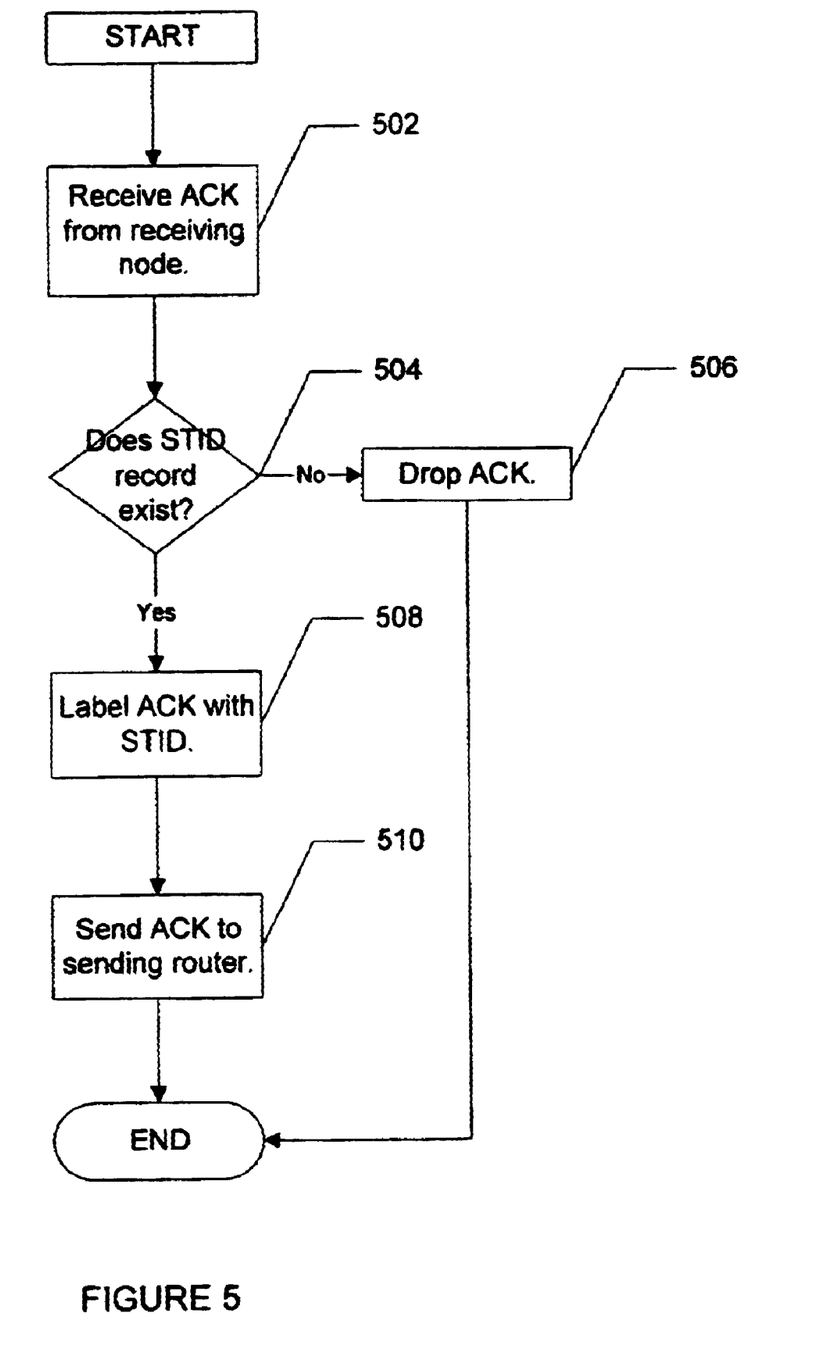
FIG. 5 is a flow chart illustrating the steps performed by the receiving router when it receives an acknowledgment packet in the method for reliable stale packet recognition in accordance with the present invention.

Once the receiving node 120 receives the packet 106, it may create an acknowledgment packet (ACK) and address it for the sending node 104. FIG. 5 is a flow chart illustrating the steps performed by the receiving router when it receives an ACK in the method for reliable stale packet recognition in accordance with the present invention. First, the receiving router 114 receives the ACK from the receiving node 120, via step 502. The receiving router 114 determines if the STID record exists for the packet 110 to which the ACK corresponds, via step 504. If not, then the transaction is no longer active, and the ACK is dropped, via step 506. If the STID record does exist, then the ACK is labeled with the STID of its corresponding packet 110, via step 508. The ACK is then sent to the sending router 108, via step 510.

Figure 6:
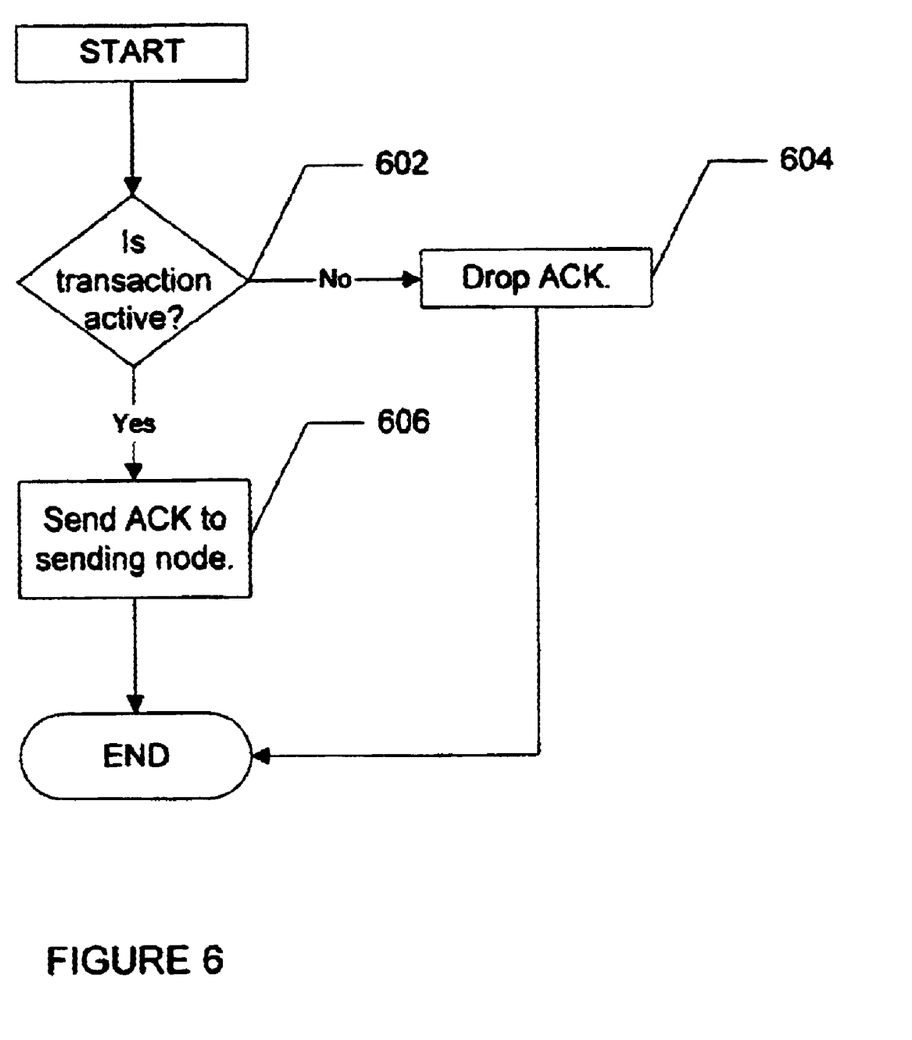
FIG. 6 is a flow chart illustrating the steps performed by the sending router when it receives an acknowledgment packet in the method for reliable stale packet recognition in accordance with the present invention.

FIG. 6 is a flow chart illustrating the steps performed by the sending router when it receives an acknowledgment packet in the method for reliable stale packet recognition in accordance with the present invention. When the sending router 108 receives an ACK, it determines if the transaction identified by the ACK's STID is still active, via step 602. If not, then the ACK is stale and is dropped, via step 604. If it is still active, then the ACK without the STID is sent to the sending node 104, via step 606.

A method for reliable stale packet recognition in a network has been disclosed. The method adds a super transaction identifier (STID) to each packet. Each transaction is assigned a unique STID by the sending router, and each packet of the transaction is labeled with this STID. The receiving router uses the STID to block duplicate packets with the same STID which arrive after the expiration of the transaction timer. In this manner, stale packets are reliably detected by the receiving router.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for packet transmission in a network, comprising the steps of:
   (a) labeling a packet with a super transaction identifier (STID), the STID uniquely indicating a transaction, wherein the labeling step (a) comprises:
      (a1) receiving the packet from a sending node,
      (a2) determining if the packet is part of a new transaction, (a3) choosing a new STID for the new transaction, if the packet is part of the new transaction,
(a4) saving the new STID for the new transaction, and
(a5) labeling the packet with the new STID;
(b) sending the packet with the STID to a receiving router; and
(c) blocking the sent packet from transmission to a receiving node if a transaction timer for the transaction indicated by the STID has expired.

2. The method of claim 1, wherein the labeling step (a) further comprises:
(a6) labeling the packet with a STID of a current transaction, if the packet is not a part of the new transaction.

3. A method for packet transmission in a network, comprising the steps of:
(a) labeling a packet with a STID, the STID uniquely indicating a transaction;
(b) sending the packet with the STID to a receiving router; and
(c) blocking the sent packet from transmission to a receiving node if a transaction timer for the transaction indicated by the STID has expired, wherein the blocking step (c) comprises:
(c1) receiving the sent packet from a sending router,
(c2) determining if a STID record exists for the STID,
(c3) determining if the transaction timer for the transaction indicated by the STID has expired, if the STID record exists,
(c4) blocking the sent packet, if the transaction timer has expired, and
(c5) sending the packet to the receiving node, if the transaction timer has not expired.

4. The method of claim 3, wherein the blocking step (c) further comprises:
(c6) determining if the STID is new, if the STID record does not exist;
(c7) allocating a new STID record, starting a new transaction timer, and sending the packet to the receiving node, if the STID is new.

5. The method of claim 4, further comprising:
(c8) blocking the packet, if the STID is not new.

6. A method for packet transmission in a network, comprising the steps of:
(a) labeling a packet with a STID, the STID uniquely indicating a transaction;
(b) sending the packet with the STID to a receiving router;
(c) blocking the sent packet from transmission to a receiving node if a transaction timer for the transaction indicated by the STID has expired;
(d) receiving an acknowledgement packet (ACK);
(e) determining if a STID record corresponding to the ACK exists;
(f) labeling the ACK with a STID in the STID record, if the STID record corresponding to the ACK exists; and
(g) dropping the ACK, if the STID record corresponding to the ACK does not exist.

7. A method for packet transmission in a network, comprising the steps of:
(a) labeling a packet with a STID, the STID uniquely indicating a transaction;
(b) sending the packet with the STID to a receiving router;
(c) blocking the sent packet from transmission to a receiving node if a transaction timer for the transaction indicated by the STID has expired;
(d) receiving an ACK;
(e) determining if a transaction indicated by a STID of the ACK is active;
(f) sending the ACK to a sending node, if the transaction indicated by the STID of the ACK is active; and
(g) dropping the ACK, if the transaction indicated by the STID of the ACK is not active.

8. A method for packet transmission in a network, comprising the steps of:
(a) labeling a packet with a STID, the STID uniquely indicating a transaction;
(b) sending the packet with the STID to a receiving router; and
(c) determining if a STID record exists for the STID;
(d) determining if a transaction timer for the transaction indicated by the STID has expired, if the STID record exists;
(e) blocking the sent packet, if the transaction timer has expired;
(f) determining if the STID is new, if the STID record does not exist; and
(g) blocking the sent packet, if the STID is not new.

9. The method of claim 8, wherein the labeling step (a) comprises:
(a1) receiving the packet from a sending node;
(a2) determining if the packet is part of a new transaction;
(a3) choosing a new STID for the new transaction, if the packet is part of the new transaction;
(a4) saving the new STID for the new transaction; and
(a5) labeling the packet with the new STID.

10. The method of claim 9, further comprising:
(a6) labeling the packet with a STID of a current transaction, if the packet is not a part of the new transaction.

11. The method of claim 8, further comprising:
(h) sending the sent packet to a receiving node, if the transaction timer has not expired.

12. The method of claim 8, further comprising:
(h) allocating a new STID record, starting a new transaction timer, and sending the packet to a receiving node, if the STID is new.

13. The method of claim 8, further comprising:
(h) receiving an ACK;
(i) determining if a STID record corresponding to the ACK exists;
(j) labeling the ACK with a STID in the STID record, if the STID record corresponding to the ACK exists; and
(k) dropping the ACK, if the STID record corresponding to the ACK does not exist.

14. The method of claim 8, further comprising:
(h) receiving an ACK;
(i) determining if a transaction indicated by a STID of the ACK is active;
(j) sending the ACK to the sending node, if the transaction indicated by the STID of the ACK is active; and
(k) dropping the ACK, if the transaction indicated by the STID of the ACK is not active.

15. A method for packet transmission in a network, comprising the steps of:
(a) receiving a packet from a sending node;
(b) determining if the packet is part of a new transaction;
(c) choosing a new STID for the new transaction, saving the new STID for the new transaction, and labeling the packet with the new STID, if the packet is part of the new transaction;

(d) labeling the packet with a STID of a current transaction, if the packet is not part of the new transaction;

(e) sending the packet to a receiving router;

(f) determining if a STID record exists for the sent packet;

(g) determining if a transaction timer corresponding to the sent packet has expired, if the STID record exists; and (h) blocking the sent packet, if the transaction timer has expired.

16. A system, comprising:

a sending router, wherein the sending router receives a packet from a sending node, wherein the sending router determines if the packet is part of a new transaction, chooses a new STID for the new transaction if the packet is part of the new transaction, saves the new STID for the new transaction, and labels the packet with the new STID, the new STID uniquely indicating a transaction; and a receiving router, the receiving router capable of communicating with the sending router utilizing a network protocol, wherein the receiving router blocks the packet from transmission to a receiving node if a transaction timer for the transaction has expired.

17. A computer readable medium with program instructions for packet transmission in a network, the instructions for:

(a) labeling a packet with a STID, the STID uniquely indicating a transaction, wherein the labeling instruction (a) comprises instructions for:

(a1) receiving the packet from a sending node, (a2) determining if the packet is part of a new transaction, (a3) choosing a new STID for the new transaction, if the packet is part of the new transaction, (a4) saving the new STID for the new transaction, and (a5) labeling the packet with the new STID;

(b) sending the packet with the STID to a receiving router; and (c) blocking the sent packet from transmission to a receiving node if a transaction timer for the transaction indicated by the STID has expired.

* * * * *